United States Patent
Niemela

(10) Patent No.: US 8,199,736 B2
(45) Date of Patent: Jun. 12, 2012

(54) DATA TRANSMISSION IN MOBILE COMMUNICATION SYSTEM

(75) Inventor: Kari Niemela, Oulu (FI)

(73) Assignee: Nokia Corporation, Espoo (FI)

( * ) Notice: Subject to any disclaimer, the term of this patent is extended or adjusted under 35 U.S.C. 154(b) by 1107 days.

(21) Appl. No.: 11/706,207

(22) Filed: Feb. 15, 2007

(65) Prior Publication Data

US 2008/0159246 A1    Jul. 3, 2008

(30) Foreign Application Priority Data

Dec. 29, 2006  (FI) ...................................... 20065866

(51) Int. Cl.
*H04H 20/67* (2008.01)
(52) U.S. Cl. ....................................... 370/339; 370/341
(58) Field of Classification Search .......... 370/338–343, 370/203, 208, 329
See application file for complete search history.

(56) References Cited

U.S. PATENT DOCUMENTS

| | | | |
|---|---|---|---|
| 5,742,592 A | 4/1998 | Scholefield et al. | |
| 5,966,412 A | 10/1999 | Ramaswamy | |
| 6,597,682 B1 | 7/2003 | Kari | |
| 2004/0120302 A1 | 6/2004 | Sebire et al. | |
| 2004/0246887 A1* | 12/2004 | Chenu-Tournier et al. | ... 370/203 |
| 2005/0089068 A1 | 4/2005 | Sun et al. | |
| 2006/0133262 A1* | 6/2006 | Sutivong et al. | ............. 370/209 |
| 2006/0203792 A1* | 9/2006 | Kogiantis et al. | ............. 370/343 |
| 2007/0002724 A1* | 1/2007 | Khan | ............. 370/203 |
| 2007/0019592 A1* | 1/2007 | Otsuki | ......... 370/338 |
| 2007/0054614 A1* | 3/2007 | Walker et al. | ................. 455/3.02 |
| 2007/0121546 A1* | 5/2007 | Zuckerman et al. | .......... 370/329 |
| 2008/0002733 A1* | 1/2008 | Sutskover | ...................... 370/436 |
| 2008/0075032 A1* | 3/2008 | Balachandran et al. | ...... 370/317 |
| 2008/0159122 A1* | 7/2008 | Dor | ................ 370/208 |
| 2008/0305805 A1* | 12/2008 | Mondal et al. | ................ 455/446 |
| 2009/0220021 A1* | 9/2009 | Ihm et al. | ....................... 375/267 |
| 2010/0074152 A1* | 3/2010 | Jalali et al. | ................... 370/280 |

FOREIGN PATENT DOCUMENTS

WO   WO-2005/069570 A1   7/2005

OTHER PUBLICATIONS

International Search Report, PCT/FI2007/050708 filed Dec. 19, 2007.

* cited by examiner

*Primary Examiner* — Kamran Afshar
*Assistant Examiner* — Khawar Iqbal
(74) *Attorney, Agent, or Firm* — Harrington & Smith

(57) ABSTRACT

An apparatus, comprising a data processing entity for processing a signal for communication in a first subchannel, in which first subchannel communication occurs simultaneously with one or more second subchannels using the same radio resource.

29 Claims, 3 Drawing Sheets

DATA TRANSMISSION IN MOBILE COMMUNICATION SYSTEM

FIELD

The invention relates to data transmission in a mobile communication network.

BACKGROUND

Increase of voice capacity is of interest in mobile communication networks. In existing networks, voice capacity increase should be provided in such a way that no or negligible modifications are needed to the terminals or the networks to support the new functionality.

SUMMARY

In an aspect, there is provided an apparatus, comprising a data processing entity configured to process a signal for communication in a first subchannel, in which first subchannel communication occurs simultaneously with one or more second subchannels using the same radio resource.

In another aspect, there is provided an apparatus, comprising means for processing a signal for communication in a first subchannel, in which first subchannel communication occurs simultaneously with one or more second subchannels using the same radio resource.

In another aspect, there is provided a method, comprising processing a signal for simultaneous communication in a first subchannel with a second signal for communication in a second subchannel using the same radio resource as a second subchannel.

DRAWINGS

In the following, the invention will be described in greater detail by means of preferred embodiments with reference to the attached drawings, in which FIG. 1 shows an embodiment of a communication system;

DESCRIPTION OF SOME EMBODIMENTS

Figure 1:
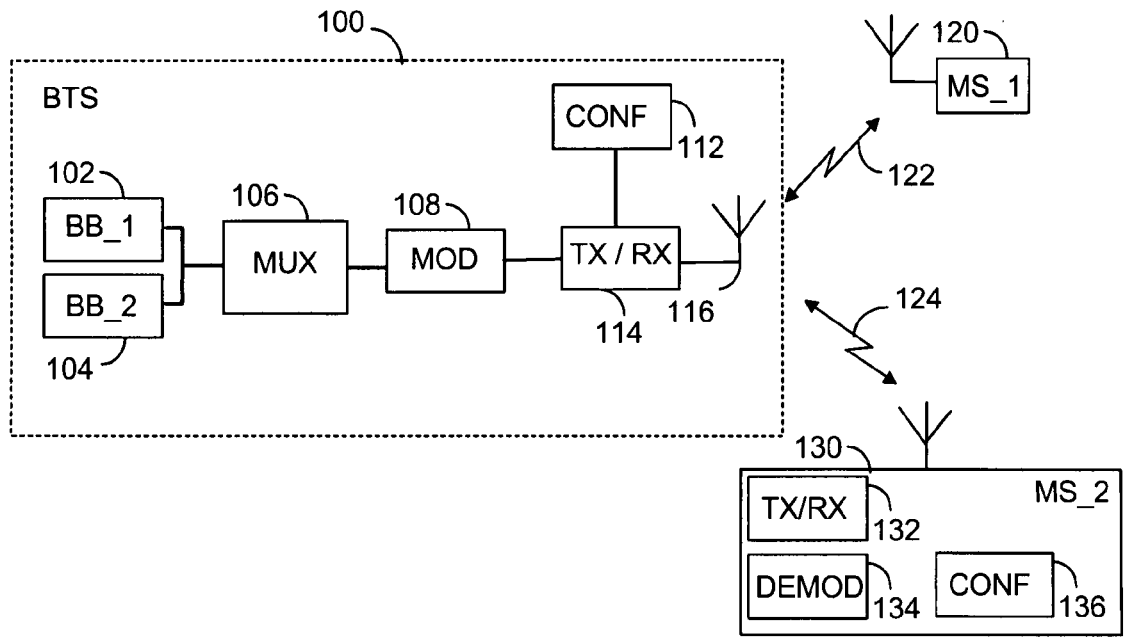
Figure 2:
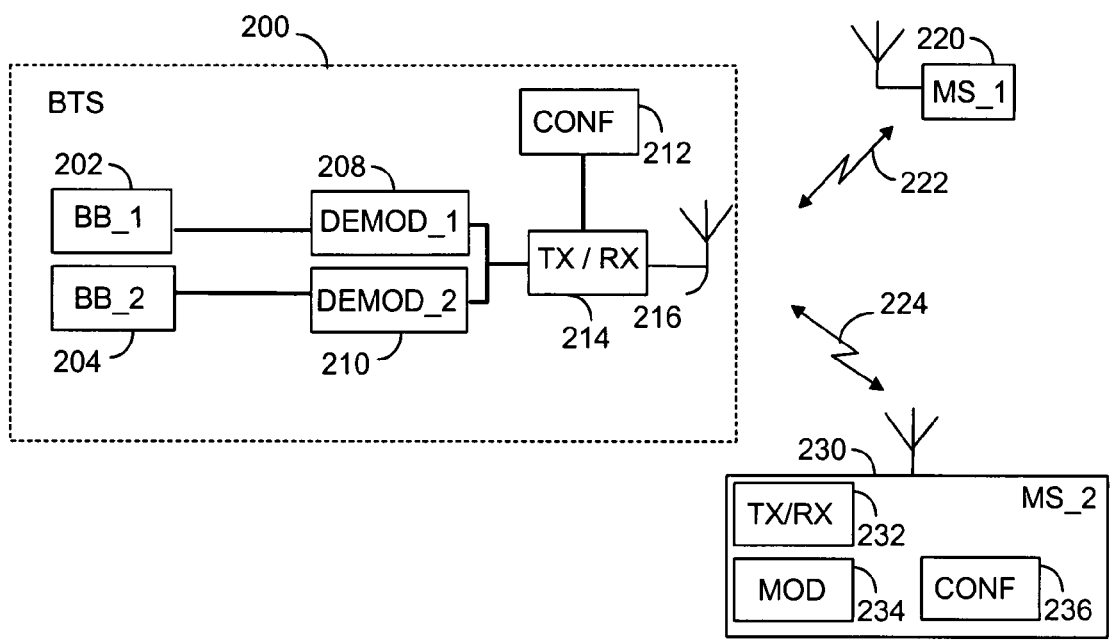
FIG. 2 shows another embodiment of a communication system.

FIG. 1 shows an embodiment of a mobile communication system. The communication system includes a base station 100 and two mobile stations 120 and 130, which are located within the radio coverage of a base station 100 and may thus have a radio connection with the base station. FIG. 2 discloses embodiments, where the user data transmission occurs in the downlink. The user data transmission may be provided in a signal or a user signal for carrying a user data stream.

In an embodiment, the mobile communication system is a GSM (Global System for Mobile communication) network. The GSM network is a TDMA (time division multiple access) radio system, wherein a radio resource at a given time is defined by a combination of a frequency and a time slot. Time slots are transmitted in a radio frame, which typically includes 8 time slots. Although FIG. 1 refers to the GSM system, the invention is not limited to the GSM system but may be applied to other radio systems as well.

The GSM system includes a plurality of traffic channels and control channels. As examples of traffic channels, TCH/F (Traffic Channel at Full Rate) and TCH/H (Traffic Channel at Half Rate) used for voice communication may be mentioned. TCH/F uses a whole radio resource for the communication of a single user, whereas TCH/H is a half rate channel in which two users share a resource and use the radio resource alternately.

A signal transmitted in a time slot is called a radio burst and consists of symbols carrying one or more bits per each symbol. A typical radio burst includes a period for a training sequence, data symbols on both sides of the training sequence, and tail symbols at the ends of the burst. A receiver uses the training sequence for equalizing a channel distortion on the burst. The structure and the modulation of the bursts may vary depending on the channel on which they are transmitted.

The base station 100 shows two baseband entities 102, 104, each of which is configured to process baseband data for one mobile station 120, 130. The baseband data streams from the entities 102, 104 may be delivered to a multiplexing entity 106, which combines the data streams for the modulating entity 108. Alternatively, the data streams of different users may be kept separate and be provided directly from the baseband entities 102, 104 to the modulating entity 108.

In FIG. 1, a mobile station 120 communicating over a radio link 122 with the base station 100 may be considered to be a standard mobile station and a mobile station 130 communicating over a radio link 124 with the base station 100 may be considered to include new functionality to facilitate simultaneous communication on the same radio resource. Alternatively also a mobile station 120 may be considered to include new functionality.

The mobile station 130 includes a transmitter/receiver entity 132 for communication with the base station 100. In addition, the mobile station includes a configuration entity 136, which corresponds to the corresponding configuration entity 112 in the base station 100. The configuration entities 112 and 136 are configured to exchange information about the usage of the radio resources in the downlink. The mobile station 130 also includes a demodulator 134. The demodulator is a counterpart of the modulator 108 in the base station in that the demodulator is configured to demodulate the signal modulated by the modulator 108 and intended to the mobile station 130.

The arrangement of FIG. 1 may be applied for several embodiments of data transmission discussed in the following.

In a first embodiment, the data stream provided for the modulating entity 108 contains data intended for both mobile stations 120, 130 in such a way that alternate bits of the data stream are intended for the first mobile station 120 and for the second mobile station 130, for instance. The data channel transmitted to the first mobile station 120 may be called the first subchannel, and the data channel transmitted to the second mobile station may be called the second subchannel. The subchannels may use the same communication resource or radio resource, such as a frequency-time slot combination simultaneously.

In an embodiment, the separation of subchannels may be provided at the transmitter by using orthogonal training sequence pairs for the subchannels such that the first subchannel may use an existing GSM training sequence and the second subchannel may use a new, orthogonal training sequence, for instance. At the receiving end, both mobile stations 120, 130 are able to receive its own signal by equalising the received signal by using the training sequence that has been allocated for it.

The modulation method used by the base station may be a QPSK (Quadrature Phase Shift Keying) modulation or a higher order modulation method with QPSK compatible subset of the modulation constellation. Higher order modulation may be 8 PSK (8 Phase Shift Keying), 16 QAM (16 Quadrature Amplitude Modulation) or 32 QAM (32 Quadrature Amplitude Modulation), for instance. In addition to the QPSK compatible modulation constellation, also a symbol rotation may need to be considered; π/4, 3π/8 or π/2, for instance. E.g. the 3π/8 rotated symbols for the current 8 PSK are defined as in (1), where i is the index of a symbol s and j is an imaginary unit:

$$\hat{s}_i = s_i \cdot e^{ji3\pi/8} \tag{1}$$

Symbol rotation may be selected to optimise the performance, to avoid zero crossings or to provide compatibility with standard GMSK mobile stations or base stations, for instance. In an embodiment, differential encoding may be applied at least for the payload period on each subchannel, that is, every other bit to enable the use of a receiver using binary demodulation. The receiver may demodulate possible symbol rotation and possible differential encoding by performing a symbol rotation for the received samples with rotation angle that that facilitates the use of a binary receiver, for instance.

In an embodiment, the modulating entity 108 uses a subset of the 8 PSK (8 Phase Shift Keying) modulation constellation with a π/2 symbol rotation. The subset has only those points of the 8 PSK constellation that are used by the QPSK (Quadrature Phase Shift Keying) modulation as shown by white dots in FIG. 3. The modulator 108 may thus map the bits of data stream received from the multiplexer 106 like in a QPSK, two bits per modulation symbol on the modulation constellation, where the first bit of the symbol is intended for the first subchannel and second bit for the second subchannel, for instance.

The mobile stations 120, 130 may thus use a BPSK (Binary Phase Shift Keying) demodulation method, such as the standard GMSK demodulation, for instance, to receive one of the subchannels of the QPSK modulated signal. Upon a received symbol, the receiver may monitor only the situation with respect to the I- or Q-axis, for instance. The receiver 120 may only be interested of the first bit of the received symbol. If the original transmitted symbol was "10" or "11", that is the reception refers to the right from the Q-axis, the mobile station 120 may conclude that the symbol intended for it was "1". Correspondingly, if the transmitted symbol was "01" or "00", the receiver 120 concludes that the symbol it received was "0".

The receiver 130 may be interested of the second bit of the received symbol. If the original transmitted symbol was "10" or "00", that is the reception refers under the I-axis, the mobile station 130 may conclude that the symbol intended for it was "0". Correspondingly, if the transmitted symbol was "01" or "11", the receiver 130 concludes that the symbol it received was "1".

In another embodiment, the mobile stations 120, 130 may use a QPSK receiver and detect only the even or odd bits of the payload period corresponding to the configured subchannel. Thus separation of channels is based on configuring of which bit of the QPSK symbol in data period is under interest. In addition, a separate ciphering may be applied on communication for the subchannels to avoid accidental misuse of the other sub channel, for instance.

Finally, the modulated signals are provided to a transmitter/receiver entity 112 for further processing before the transmission of the signal via a base station antenna 114.

The mobile station 130 may be a mobile station that is capable of receiving on the second subchannel. To be able to communicate on the second subchannel in some embodiments, the configuration entities 112 and 136 may exchange information about the usage of the second subchannel. At the connection set up, the configuration entity 136 may indicate to the configuration entity 112 that the mobile station 130 is capable of communicating on the second subchannel. In the reverse direction, the configuration entity 112 may indicate to the configuration entity 136 that a second channel on a given radio resource has been allocated to the mobile station 130. In an embodiment, the allocation indicates the mobile station a training sequence that it should use on the channel. These messages may be included to existing signalling messages transmitted on a control channel used during connection set up in SDDCH (Standalone Dedicated Control Channel) or FACCH (Fast Associated Control Channel).

The mobile station 130 also includes a demodulator 134. The demodulator is a counterpart of the modulator 108 in the base station in that the demodulator is configured to demodulate the signal modulated by the modulator 108. The demodulator is thus configured to demodulate a signal transmitted on the second sub channel.

The embodiments disclosed above may also be combined such that the base station may provide transmissions on the both subchannels with different training sequences and additionally use QPSK receiver.

In an embodiment, discontinuous transmission (DTX) may be taken into account. This means that at a certain moment of time, there may be no transmission for one of the mobile station. In one embodiment, DTX on one subchannel is taken into account by using zeros or other idle pattern on the channel, which has no active transmission. Alternatively, the base station may use lower order modulation during the discontinuous transmission on one subchannel. For instance, QPSK could be changed to BPSK or GMSK during the DTX period on the other sub channel. Alternatively, only the payload period may use BPSK like a modulation constellation, while the training sequence may be QPSK modulated.

FIG. 2 shows an embodiment, where the transmission on the two subchannels using the same radio resource occurs on the uplink. Reference is made to FIG. 1 in that the functionality of the units is basically reverse in FIG. 2 in comparison the respective units in FIG. 1. Thus, in the base station 200 of FIG. 2, a transmitter/receiver 214 is configured to receive transmission on the two subchannels, and a configuration entity 212 is configured to configure radio links 222, 224 for reception such that data received from one mobile station 220 is received on the first subchannel 222 and data from the other mobile station 230 is received on a second subchannel 224.

The base station 200 further includes two demodulators 208 and 210. The demodulator 208 is configured to demodulate the data received on the first subchannel and the demodulator 210 is configured to demodulate the data received on the second subchannel.

In FIG. 2, the mobile station 220 is configured to transmit on the first subchannel and may be a standard mobile station. The mobile station 230, on the other hand, is configured to transmit on the second subchannel. The configuration entity 236 of the mobile station 230 may thus configure the connection between the mobile station 230 and the base station 200 in such a way that the mobile station indicates to the base station that it is capable of transmitting on the second subchannel, and subsequently receives an allocation message from the base station that the second subchannel is reserved for use by the mobile station 230.

In an embodiment, the training sequences used in the uplink transmission on the same radio resource are different, and the training sequences used by the mobile stations may be orthogonal to each other. A new set of orthogonal training sequences, in addition to the set of standard training sequences of the GSM system, may be used for the purpose of communication on the second channel.

Mobile stations 220 and 230 may use standard GMSK in uplink transmission. The base station may use antenna diversity with an interference rejection diversity combining receiver, a successive interference cancellation receiver or a joint detection receiver, for instance to separate different users.

Figure 3:
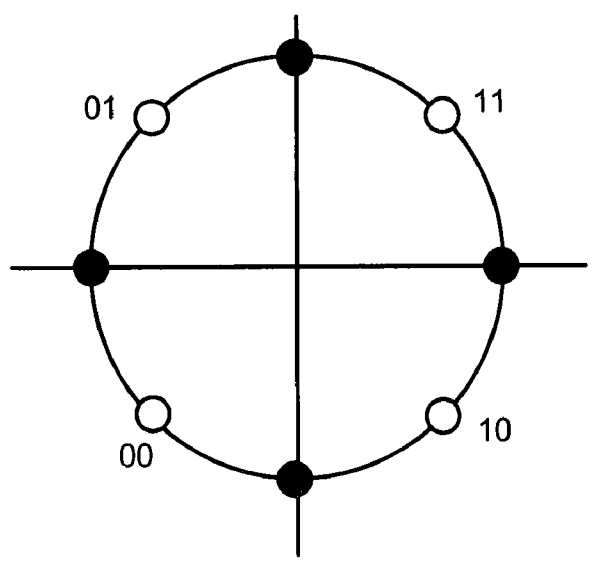
FIG. 3 shows an example of a modulation constellation.

FIG. 3 shows a modulation constellation, a 8PSK constellation, for carrying a first subchannel and a second subchannel in which the first bit is used in the first subchannel and the second bit in the second subchannel.

Figure 4:
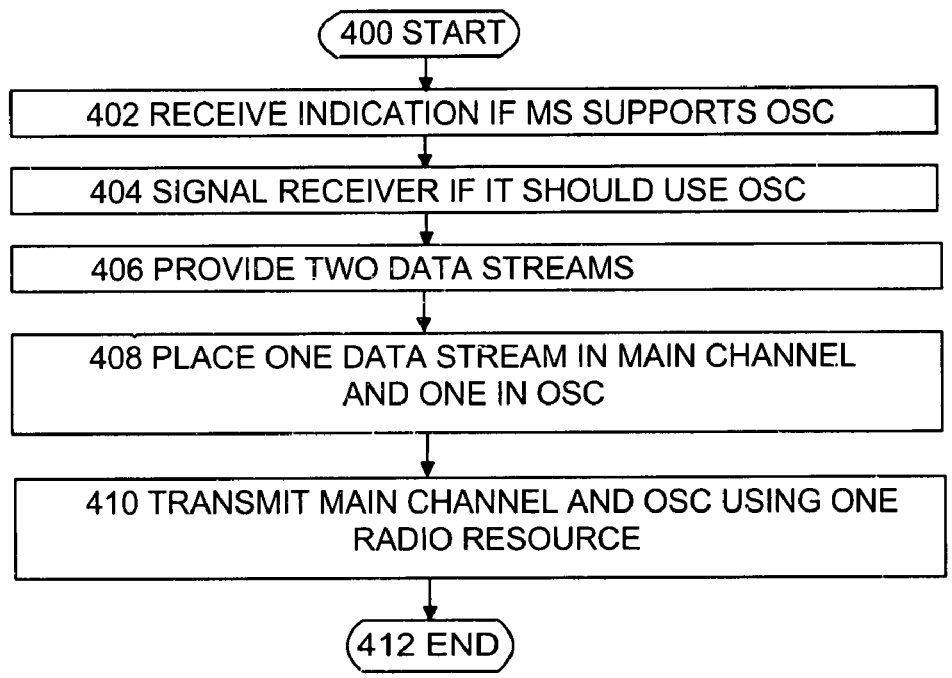
FIG. 4 shows one embodiment of a method.

FIG. 4 shows one embodiment of a downlink method. In the embodiment, a base station transmitting to two mobile stations may be provided. The radio system is a TDMA radio system in which the mobile stations are allocated timeslots from a predetermined transmission frequency or frequencies for use of a frequency hopping algorithm. In the embodiment, the base station transmits to two mobile stations using a radio resource simultaneously. That is, a combination of a frequency and time slot is allocated to two mobile stations at the same time. The resource may be a traffic channel resource or a control channel resource.

In 402, the mobile stations and the base station communicate with each other on the allocation of the radio resource. In this context, the mobile station may indicate to the base station that it is capable of receiving on a second subchannel. The base station may allocate the two mobile stations mutually orthogonal training sequences for use in the downlink communication.

In 404, the base station allocates the receivers to the time slots. If the base station receives an indication from a mobile station that it is capable of receiving on an orthogonal second subchannel, the base station may allocate the mobile station accordingly. That is, the base station may for instance allocate a time slot to two mobile stations, one of which is a standard mobile station not capable of supporting a second subchannel and one of which is capable of supporting such a communication.

In 406, the base station provides two data streams, one for each receiver. The data streams may also be directed to a single receiver. At the start, the two data streams may be provided in a QPSK data stream form such that the data bits are alternately directed to a first receiver and a second receiver. Then, the data bits of the original data stream may be divided into a first data stream and a second data stream. The quaternary QPSK data stream is thereby divided to give two binary GMSK or BPSK deploying possible symbol rotation compatible data streams of which one is directed to one mobile station and the other one to the other mobile station. The data modulated by using a higher order modulation scheme may thus be received by using a lower order modulation at the receivers. The receivers may then omit some of the received bits.

In 408, the two data streams are modulated with respective modulation constellations.

In 410, the two data streams are transmitted simultaneously by using the radio resource, which has been reserved and informed to the mobile stations.

When seen from the receiver's point of view, the receiver or the mobile station may perform the following tasks. At first, when setting up the connection, the mobile station may need to indicate to the base station that the mobile station is capable of receiving on an orthogonal subchannel. Then, the receiver or the mobile station may receive an indication from the base station that a first or second channel has been allocated to the receiver. Then, when receiving transmission on the second channel, the mobile station may demodulate at least part of the burst data by using a demodulation constellation similar to the modulation constellation used by the base station when modulating data on the second channel. In an embodiment, the receiver demodulates the training sequence with a first modulation constellation and the payload data with a second modulation constellation. The second modulation constellation may be phase shifted 90 degrees in comparison with the first modulation constellation.

Figure 5:
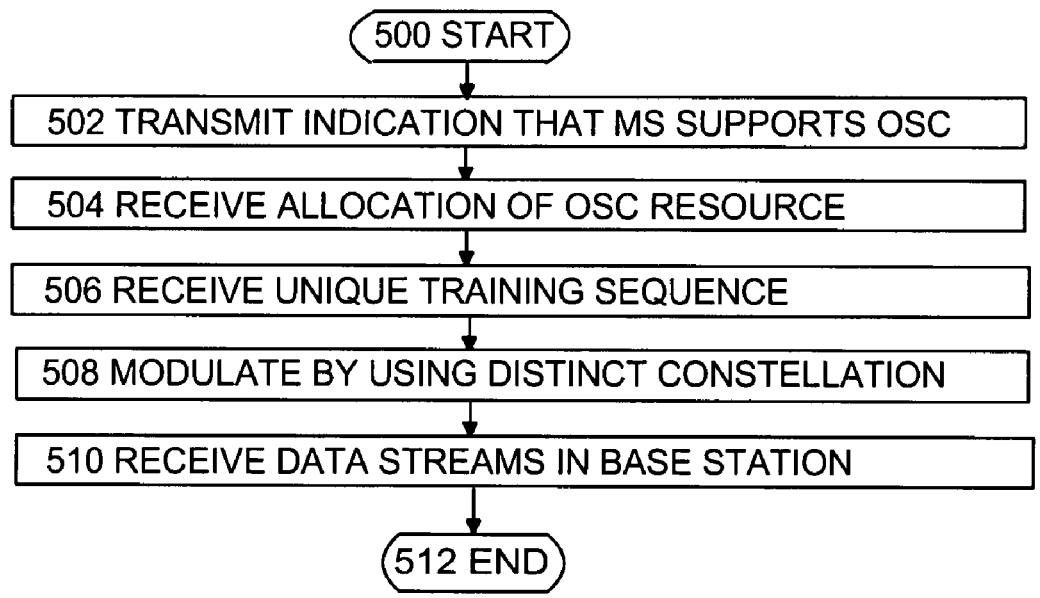
FIG. 5 shows another embodiment of a method.

FIG. 5 shows one embodiment of a method. The method is applicable in the uplink direction, that is, the direction from one or more mobile stations towards the base station. In 502, a mobile station may send an indication that the mobile station is capable of supporting an orthogonal subchannel. A mobile station may thus indicate to the base station that the mobile station is capable of operating on a subchannel, thus requiring operation that is different from the operation of an ordinary mobile station. In 504, the base station sends an indication to the mobile station that an orthogonal subchannel has been allocated for uplink transmission for the mobile station. The base station may thus allocate an uplink timeslot on the same frequency for use by two mobile stations. One of the two mobile stations may be an ordinary mobile station, which may operate on the first subchannel of the radio resource, and the other mobile station may operate on the second subchannel.

In 506, the base station sends the training sequences to be used by the mobile stations in their uplink transmission. In an embodiment, the training sequences allocated for the mobile stations are mutually as orthogonal as possible. Thus, in one uplink radio resource, the base station receives two signals using different training sequences.

In 508, the mobile stations send their uplink transmission. The mobile station operating on subchannels may send its transmission by using ordinary GMSK modulation.

In 510, the base station receives the data streams transmitted by the mobile stations using the same radio resource. By way of different training sequences and mutually orthogonal modulation constellations, the base station is capable of demodulating and separating the two data streams from the two mobile stations.

The concept of an orthogonal sub-channel may be provided in the GSM system for following channels, for instance: TCH/F (Traffic Channel at Full Rate), SACCH/F/H (Slow Associated Control Channel at Full/Half rate), FACCH/F/H (Fast Associated Control Channel at Full/Half Rate), SDCCH (Standalone Dedicated Control Channel), (P)RACH ((Packet)Random Access Channel), (P)AGCH ((Packet)Access Grant Channel), (P)PCH ((Packet)Paging Channel). The capacity of these channels may be doubled by providing a sub-channel using the same resource as the original channel.

In an embodiment, there is provided an apparatus, comprising a data stream provider configured to provide two data streams, a data processing entity configured to provide one data stream into a first subchannel and the other data stream into a second subchannel, and to process the data stream in the first subchannel and the data stream in the second subchannel in such a manner that they can be transmitted by using the same radio resource. Here the apparatus may be either a base station or a mobile phone. The transmission may thus either be from a base station to one or more mobile stations, or from one or two mobile stations to a base station. The first subchannel and the second subchannel may use a same radio resource, such as a combination of a frequency and timeslot.

In an embodiment, there is provided an apparatus, wherein the data processing entity is configured to modulate the data stream provided to the second subchannel at least partly with a different modulation constellation as the data stream modulated to the first subchannel. The modulation constellation used in the different subchannels may differ at least with respect to the payload data of a radio burst. That is, in downlink transmission, the training sequence may be common to both subchannels and may be modulated with the same constellation. However, the payload data of the bursts may be modulated with mutually different constellations. The difference of the constellations may here mean that one of the constellations is a phase shifted set of modulation points compared to the other one. That is, one of the constellations may use a first set of 2 $\pi/2$ separated points of the 8 PSK constellation, and the other constellation may use the other set of 2 points of the 8 PSK constellation.

In an embodiment, there is provided an apparatus, wherein the data processing entity is configured to provide a radio burst for transmission on the first subchannel and a radio burst for transmission on the second subchannel with mutually orthogonal training sequences. In uplink transmission, the first subchannel and the second subchannel may use mutually orthogonal training sequences. In that case, the bursts may be modulated with the same constellations.

Although the embodiments refer to only one second subchannel, there may a plurality of them. The order of the modulation method used by the transmitter may be also more than twice the demodulation method of the receivers.

Embodiments of the invention or parts of them may be implemented as a computer program comprising instructions for executing a computer process for implementing the method according to the invention.

The computer program may be stored on a computer program distribution medium readable by a computer or a processor. The computer program medium may be, for example but not limited to, an electric, magnetic, optical, infrared, or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Other than computer program implementation solutions are also possible, such as different hardware implementations (entities or modules), such as a circuit built of separate logics components or one or more client-specific integrated circuits (Application-Specific Integrated Circuit, ASIC). A hybrid of these implementations is also feasible.

The embodiments provide a system that can double both downlink and uplink radio capacity for a voice service and that is applicable in low cost terminals such as GSM voice-only terminals or terminals with similar complexity. It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising at least one processor; and at least one memory including computer program code, the at least one memory and the computer program code configured to, with the at least one processor, cause the apparatus to perform at least the following:

to receive a data stream; and to process the data stream for communication in a first subchannel, wherein communication occurs in the first subchannel simultaneously with one or more second subchannels using a same radio resource, where the first subchannel is between a first mobile station and a base station, where the one or more second subchannels is between a second mobile station and the base station, where the radio resource is a combination of a frequency and a timeslot and where a first subset of a modulation constellation is used for the first subchannel and a second subset of the modulation constellation is used for the second subchannel.

2. The apparatus according to claim 1, wherein the at least one memory and the computer program code are further configured to cause the apparatus to process at least two data streams, each for communication in the first subchannel or in one of the one or more second subchannels using the same radio resource simultaneously.

3. The apparatus according to claim 2, wherein the at least one memory and the computer program code are further configured to cause the apparatus to modulate two data streams of the at least two data streams with a quaternary modulation, such that the first or the second subchannel can be demodulated with a receiver using binary demodulation.

4. The apparatus according to claim 3, wherein the at least one memory and the computer program code are further configured to cause the apparatus to rotate quaternary modulation symbols with an offset between 0 and $2\pi$, such that the first or the second subchannel can be demodulated with a receiver using binary demodulation.

5. An apparatus according to claim 1, wherein the at least one memory and the computer program code are further configured to cause the apparatus to perform differential encoding, such that the first or the second subchannel can be demodulated with a receiver using binary demodulation.

6. The apparatus according to claim 1, wherein the first subset of the modulation constellation is orthogonal compared to the second subset of the modulation constellation.

7. The apparatus according to claim 1, wherein the at least one memory and the computer program code are further configured to cause the apparatus to provide the processed data stream for communication on a radio channel by using radio bursts, each burst including a training sequence and payload data.

8. An apparatus according to claim 7, wherein the at least one memory and the computer program code are further configured to cause the apparatus to provide a radio burst for transmission on the first subchannel and a radio burst for transmission on the second subchannel with different training sequences.

9. The apparatus according to claim 8, wherein the at least one memory and the computer program code are further configured to cause the apparatus to use a same modulation constellation when modulating the training sequences of the radio bursts on a first subchannel and a second subchannel.

10. The apparatus according to claim 8, wherein the at least one memory and the computer program code are further configured to cause the apparatus to use a different modulation constellation when modulating a payload portion of a radio burst to the first subchannel in comparison to modulating a payload portion of a radio burst to the second subchannel.

11. The apparatus according to claim 7, wherein the at least one memory and the computer program code are further configured to cause the apparatus to provide a same training sequence for radio bursts that use the same radio resource on the first subchannel and the second subchannel.

12. The apparatus according to claim 7, wherein the at least one memory and the computer program code are further configured to cause the apparatus to perform ciphering for the payload data at least on the first subchannel or on the second subchannel.

13. The apparatus according to claim 1, wherein the at least one memory and the computer program code are further configured to cause the apparatus to modulate the data stream with a higher order modulation method receivable with lower order demodulation methods.

14. The apparatus according to claim 1, wherein the at least one memory and the computer program code are further configured to cause the apparatus to change a higher order modulation method used in modulating data streams to a lower order modulation method when there is discontinuous transmission on the first subchannel or on one of the one or more second subchannels.

15. The apparatus according to claim 14, wherein the lower order modulation method is applied for a payload period.

16. The apparatus of claim 1, where the apparatus is embodied in an integrated circuit.

17. An apparatus, comprising:
means for receiving a data stream; and
means for processing the data stream for communication in a first subchannel, wherein communication occurs in the first subchannel simultaneously with one or more second subchannels using a same radio resource,
where the first subchannel is between a first mobile station and a base station,
where the one or more second subchannels is between a second mobile station and the base station,
where the radio resource is a combination of a frequency and a timeslot and
where a first subset of a modulation constellation is used for the first subchannel and a second subset of the modulation constellation is used for the second subchannel.

18. A method, comprising:
receiving a data stream; and
processing the data stream for simultaneous communication in a first subchannel with a second data stream for communication in a second subchannel using a same radio resource as the second subchannel,
where the first subchannel is between a first mobile station and a base station,
where the one or more second subchannels is between a second mobile station and the base station,
where the radio resource is a combination of a frequency and a timeslot and
where a first subset of a modulation constellation is used for the first subchannel and a second subset of the modulation constellation is used for the second subchannel.

19. The method according to claim 18, wherein the processing comprises processing at least two data streams, each for communication in one of a first subchannel and one or more second subchannels; and
wherein the method further comprises processing the first subchannel and the second subchannel for communication by using the same radio resource.

20. The method according to claim 19, further comprising: modulating two of the at least two data streams with a quaternary modulation, such that at least one of the first and the one or more second subchannels can be demodulated with a receiver using binary demodulation.

21. The method according to claim 20, further comprising: rotating the quaternary modulation symbols with an offset between 0 and $2\pi$, such that the first or the second subchannel can be demodulated with a receiver using a binary demodulation.

22. The method according to claim 18, where the first subset of the modulation constellation is orthogonal compared to the second subset of the modulation constellation.

23. The method according to claim 18, further comprising: providing the processed data stream for communication on a radio channel by using radio bursts, each burst including a training sequence and payload data.

24. The method according to claim 23, further comprising: providing a radio burst for transmission on the first subchannel and a radio burst for transmission on the second subchannel with different training sequences.

25. The method according to claim 23, further comprising: providing a same training sequence for radio bursts that use the same radio resource on the first subchannel and the second subchannel.

26. The method according to claim 23, further comprising: using a same modulation constellation when modulating the training sequences of the radio bursts on the first subchannel and the second subchannel.

27. The method according to claim 23, further comprising: using a different modulation constellation when modulating a payload portion of a radio burst to the first subchannel in comparison to modulating a payload portion of a radio burst to the second subchannel.

28. The method according to claim 18, further comprising: modulating the data stream with a higher order modulation method receivable with lower order modulation methods.

29. A non-transitory computer readable medium tangibly encoded with a computer program executable by a processor to perform actions comprising:
receiving a data stream; and
processing the data stream for simultaneous communication in a first subchannel with a second data stream for communication in a second subchannel using a same radio resource as the second subchannel,
where the first subchannel is between a first mobile station and a base station,
where the one or more second subchannels is between a second mobile station and the base station,
where the radio resource is a combination of a frequency and a timeslot and
where a first subset of a modulation constellation is used for the first subchannel and a second subset of the modulation constellation is used for the second subchannel.

* * * * *